Dec. 11, 1962 J. A. CHASE 3,067,495
DEVICE FOR LOADING WIRE WORK PIECES
Filed Sept. 1, 1959 2 Sheets-Sheet 2
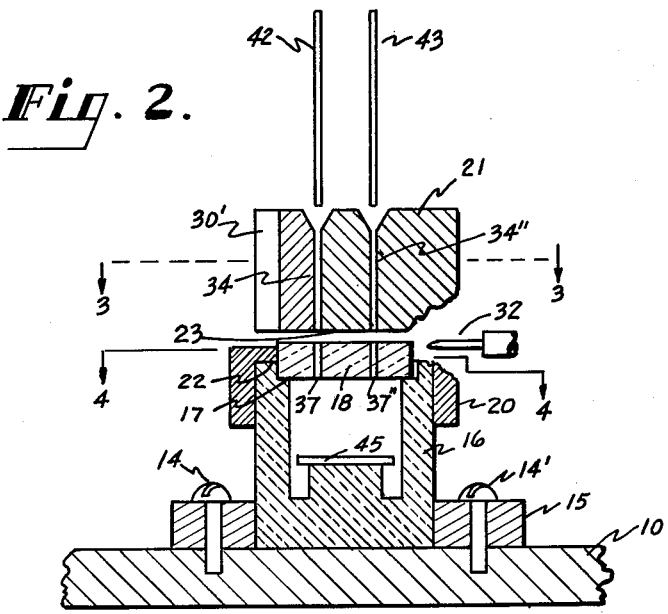
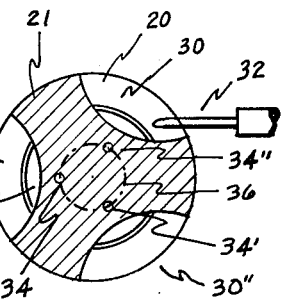
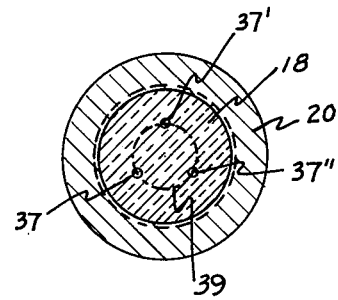
INVENTOR.
JOHN A. CHASE
BY
L A Larsen
ATTORNEY United States Patent Office 3,067,495
Patented Dec. 11, 1962

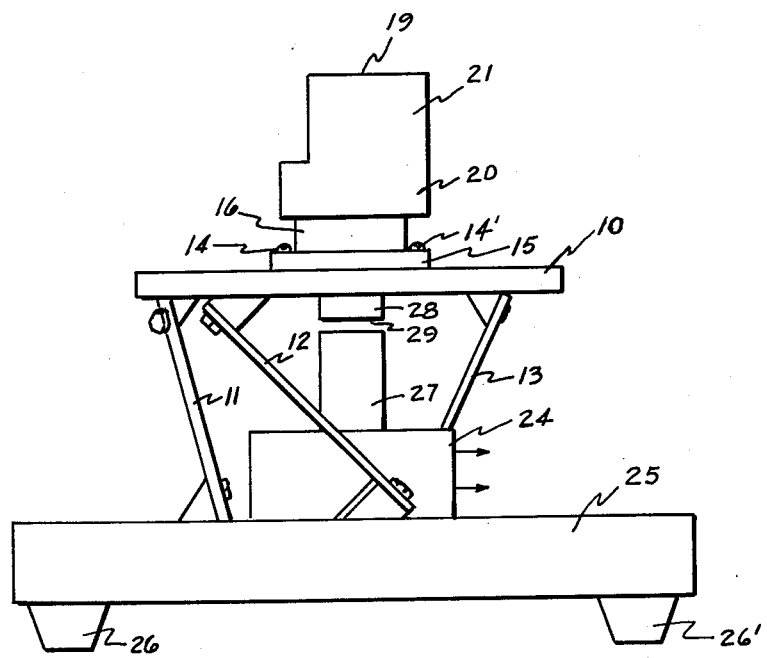

3,067,495
DEVICE FOR LOADING WIRE WORK PIECES
John Anthony Chase, Nutley, N.J., assignor to Radio Corporation of America, a corporation of Delaware
Filed Sept. 1, 1959, Ser. No. 837,448
6 Claims. (Cl. 29—203)

The invention relates in general to loading devices, and more particularly to such devices as are used for loading wire work pieces into and through selected openings in a wafer-shaped work piece.

One environment in which the invention finds utility is in the manufacture of electron tubes. Some electron tube constructions include a wafer-shaped header, or base member, which has lead-in and support wires extending therethrough. In the manufacture of such tubes the header may be fabricated with suitable openings arranged in a selected pattern and extending therethrough for receipt of the wires. The wires then may be passed into, and part of the wire passed through, the header openings. They then are brought into contact with selected electrode structures and usually are brazed to such structures, and held firmly by the wafer header in the finished tube, whereby they perform functions, among which are those, of supporting the electrode structures, as well as acting as conducting lead wires for the electrodes with which they are associated. The fastening of the lead-in wires to the electrodes is done by a brazing operation while these tube components are held in a jig. The header may be of the order of one half inch in diameter, as it is in some electron tubes, and a plurality of openings are provided therein, and a threading of the wires into and through all, or selected ones, of the openings normally is an exacting, and time consuming, operation.

In order that proper leads may be joined to the electrode structure with which they are meant to perform in the finished tube, the openings in the header, or base wafer, are arranged in a particular selected configuration and the loading device must be such that it can pass the conductors through openings arranged in such configuration or pattern. Further, since the electrode structures in the tube generally are not all equidistant from the base or header of the tube, all of the lead-in and supporting wires, may not be of the same length. In such case, therefore, the device must operate with wires, or inserts, of varying lengths. Also, the device must be positive in action; that is, it must be able to load all of the wires into the work piece which are intended for the work piece, and means must be provided to assure this accomplishment.

Accordingly it is an object of the invention to provide a device for facilitating the loading of wires and the like into openings in work pieces, and which device is of particular utility where such pieces are relatively small.

Another object of my invention is to load wires and the like through openings in a member, arranged in a selected configuration to bring them into working relationship with other work pieces with which they are to be associated.

A still further object of my invention is to load wires and the like, as set out above, wherein the loaded elements may be of differing lengths.

Further objects will be apparent from this specification and appended drawings.

In general my apparatus contemplates the provision of a holder into which is placed the work piece having apertures therein, which are arranged in a selected pattern and into which wires or the like are to be loaded. The work piece is free to rotate in the holder, that is, it is not fastened to the holder and may rotate under the influence of forces tending to make it do so. In the manufacture of electron tubes, the work piece has been the wafer base or header of the electron tube, and the holder has been a shoulder formation in a brazing jig construction, and into which jig there has been placed electrode structures with which the loaded wires will be joined in the finished tube.

Over the wafer holder, and spaced apart from the wafer so that it will not rest on, or restrain rotation of the wafer, has been placed the loading jig having openings through it in a pattern corresponding to the openings through the wafer. In electron tube manufacture utilizing my invention, the loading jig has been held relatively to the brazing jig, so that the lead wires which will pass through the wafer header, or base, will come into contact with the proper electrodes with which the wires are to be joined in the brazing jig.

The loading jig is supplied with wires or the like which are to pass into the work piece. These will not pass into the work piece unless the holes in the work piece are aligned with those in the loading jig. Therefore, necessary forces are applied to the work piece and loading jig to rotate the work piece, and since the work piece is free to rotate, it will do so. At some time during its rotation, it will assume a position wherein its openings, in effect, are continuations of the openings in the loading jig, and so the wires in the loading jig will pass into these openings in the work piece. In practice, it has been found that a vibratory force applied to the work piece holder and the loading jig will impart the force to the work piece necessary to make it rotate, and when it has assumed the desired position, the vibratory force facilitates the passing of the wires into and through the work piece openings where they may contact appropriate members with which they may be associated.

For the purpose of rotating the work piece more quickly than would be done by the vibratory force alone, additional means may be provided, preferably in close proximity to the work piece to force it to the desired position with respect to the loading jig in a minimal time. In practice this has been done by providing a nozzle to direct a jet of air at a suitable angle to the side of the work piece to urge the work piece to rotate.

To facilitate loading of the wires, or other members into the loading jig, the ends of the openings in the loading jig into which these elements are introduced into the jig, are made larger than the normal size of the opening through the entire loading jig.

My invention will be understood best by reference to the disclosure of the specification taken in conjunction with the drawings, in which:

FIG. 1 shows a side elevation of a loading device according to the invention;

FIG. 2 is an elevational transverse view and shows structural features of the loading device, including loading and assembling fixtures;

FIG. 3 is a transverse view taken along the line 3—3 of FIG. 3 and shows structural features of the loading fixture; and FIG. 4 is a transverse view taken along the line 4—4 of FIG. 3 and depicts the free position of a wafer-shaped header work piece in the loading fixture.

There is shown in FIG. 1 a loading device embodying the invention. The loading device includes a table 10 resiliently mounted on three legs or arms, 11, 12, 13, which may be made of spring material. Mounted on the table 10, and fixed thereto as by screws 14, 14' is a ring shaped holder 15 defining a cavity for receiving an assembling fixture 16 which is cylindrical in shape. The assembling fixture includes a shoulder 17 (FIG. 2) on which a wafer-shaped header work piece 18 is adapted to rest in loose fashion. The assembling fixture might, for example, be in the nature of a brazing jig in which tube components to be associated with the loaded wires are placed prior to the introduction of the wires or like members into the fixture. Partly telescoped snugly over the assembling fixture is a loading fixture 19 including a cylindrical skirt portion 20 and a cylindrical body portion 21, the latter having at least one part of its side removed for a purpose to be described hereinafter. The skirt portion 20 defines a shoulder 22 resting on the upper end of the assembling fixture and spaced from an inner end wall 23 of the cylindrical body portion 21 a sufficient distance to provide clearance between such end wall and the wafer work piece 18.

For vibrating the table 10 to reduce the friction between the wafer work piece 18 and its support 16 and to cause the wafer to travel on its support, a vibrator 24 is fixedly mounted on a base 25 secured to three resilient legs two of which are shown at 26, 26'. The legs referred to may be made of rubber. This vibrator may be of a type conventionally known as a Syntron Vibrator. Three support arms 11, 12, 13 (FIGS. 1 and 2) serve to support the table 10, and to convert a portion of the vibratory force from vibrator 24, into a motion of table 10 which includes axial and torque components. Suitable electrical energy may be supplied to the leads indicated by arrows extending from the vibrator.

The vibratory force of the vibrator 24 is transmitted by a piston 27 to a block 28 across a gap 29. The block 28 is fixed to the underside of table 10. The gap 29 is provided so that each vibratory extension of piston 27 permits contact with the block 28, to elevate and rotate the table 10 under the control of the flexible arms 11, 12, 13, and to permit freedom of such contact when the piston subsequently retracts. In this way, the mass of the table 10 and the elements supported thereby does not constitute a restraint to a relatively rapid retraction of the piston 27.

In this way, each extension of the piston 27 will rapidly raise and at the same time slightly rotate the table 10, thus imparting a torque to work pieces thereon. Such torque causes the wafer to rotate about its axis.

Further detailed consideration of a loading device embodying the invention will be presented in connection with FIGS. 2, 3 and 4.

As shown in FIGS. 2 and 3 one or more side portions of the body portion 21 of the loading fixture 19 is removed to define one or more recesses 30, 30', 30''. At least one of such recesses is necessary for a purpose to be described, although a plurality of recesses is advantageous in eliminating pockets of air and reducing the criticality requiring observance in positioning the loading fixture on the assembling fixture. The function served by a recess 30, 30', 30'', is to expose the wafer work piece to a nozzle 32 connected to a source (not shown) of air under pressure. The nozzle is angularly related to the axis of the wafer 18 in such a way as to cause the wafer to rotate axially in response to an air jet from the nozzle referred to. The direction of rotation of the wafer in response to the air jet is the same as that produced by the vibrator 24. One purpose of the air jet from nozzle 32 is to supplement the torque produced by the vibrator 24 and to thereby expedite a loading operation.

As shown in FIG. 2, the body portion 21 of the loading fixture 19 is provided with a plurality of parallel passageways two of which, 34 and 34' are shown. The passageways referred to are disposed in a circular array, the circle 36 of the array being shown in phantom in FIG. 4, which also shows relative positioning of three such passageways or openings 34, 34' and 34''. The wafer work piece 18, as shown in FIG. 4 is also provided with a plurality of openings, three of which 37, 37', 37'', are disposed on a circle 39 shown in phantom. The circles 36 of the loading jig and 39 of the wafer have the same diameter, the passageways 34, 34', 34'' and openings 37, 37', 37'' preferably have substantially the same diameter, and the passageways and openings in the body portion 21 of the loading fixture, and those in the wafer work piece, are similarly oriented angularly in a pattern that assures simultaneous axial register of the passageways and openings, when the wafer 18 is rotated to a predetermined position in either angular direction about its axis. While three openings in the wafer and loading jig have been illustrated, it will be appreciated that this is by way of example only. Openings in the jig and corresponding openings in the work piece may be of any selected arrangement and pattern. In electron tube bases, for example, there may be several sets of openings wherein the sets are spaced from the center of the tube base by unequal radial distances, and the openings in any one set spaced apart from each other as illustrated with respect to openings 37, 37' and 37'' in the wafer of FIG. 4 for example. Thus, no matter how many passageways and openings are provided, simultaneous register therebetween will occur when the wafer 18 is rotated to a predetermined position.

Where wafer work piece 18 comprises the base member of an electron tube, it may be made of a ceramic material, such as Alumina, for example, and the walls defining the openings 37, 37' and 37'' therethrough, may be coated with a metal such as molybdenum. When so coated, the openings are adapted to receive loosely, wires 42, 43 shown in FIG. 2. The wires referred to may also be made of molybdenum. For later fixing the wires to the walls of the wafer openings, the wires may be coated with a brazing material such as copper.

In some instances it may be preferable not to pre-coat the wire work pieces with brazing material but to supply such material in a later brazing operation. In this event, sufficient space should be provided between the wires and the opening walls to permit migration of the brazing material therebetween. This space should preferably be of capillary magnitude to cause the softened brazing material to migrate thereinto at least partly in response to surface tension.

As will be seen in FIG. 2, the upper end portions of passageways 34, 34', 34'' in the loading fixture are provided with walls that flare outwardly toward the upper ends of the passageway. This facilitates a feeding of the wires into the passageways aforementioned. Such feeding may be accomplished manually or by mechanized means (not shown).

In situations where the wire work pieces 42, 43 are not immediately brazed to the walls of openings 37, 38 after a loading operation and while supported on assembling fixture 16, the degree of projection of the wires from either face of wafer 18 is not critical. Thus, it is sufficient in these circumstances to provide a stop 45 within the assembling fixture 16 (FIG. 2) to limit the downward fall of the wire work pieces 42, 43 during a loading operation. Thereafter, and prior to brazing, the wire work pieces may be oriented into desired positions.

On the other hand, when the assembling fixture 16 also serves to hold the work pieces in a brazing operation for example, in the assembly of an electron tube, it is desirable to substitute for the stop 45, electrode elements (not shown) to which the wire work pieces are to be brazed. Abutment of the wire work pieces against such elements will determine their final positions with respect to wafer 18 and the electrode elements referred to, for brazing. After brazing, the portions of the wires extending from the face of the wafer remote from the electrode elements may be trimmed to desired lengths.

While it has been indicated in the foregoing that the wafer work piece 18 is loosely positioned with respect to the assembling fixture 16 and the loading fixture 19 to permit free rotation of the wafer about its longitudinal axis in response to the torque produced by the vibrator 24 and the air jet from nozzle 32, it should be observed that the spacing between the sides of the wafer and the portion of the assembly fixture extending above the shoulder 17 should not be large enough to allow the wafer to move radially through a distance to defeat the register between passageways 34, 34', 34'' and the openings 37, 37', 37" produced by the rotation of the wafer. In this connection it may be noted that the spacing between the upper surface of wafer 18 and the inner surface 23 of the loading fixture (FIG. 2) is not critical other that it should be sufficient to permit free rotation of the wafer.

It will be appreciated that the passageways and openings provided in the loading fixture 19 and in the wafer 18, may be disposed in several concentric arrays. The wires extending into such openings in the wafer in each array, when used in electron tube assembly, are adapted to serve as conducting lead-ins and/or supports for a given electrode element, the wires in the several arrays being associated in this manner with several electrode elements. Where more than one circular array is provided, it is important to dispose the openings and passageways in the wafer 18 and in the loading fixture 19 in such spaced relation in each array, as to permit simultaneous register thereof when the wafer is rotated to a predetermined position.

The term "wire work piece" as used herein, is intended to encompass elongated work pieces, whether in the form of wires, rods, tubes, and sleeves, of any cross sectional configuration.

What is claimed is:

1. Apparatus for introducing wire work pieces into openings arranged in a selected pattern in a work piece, comprising a support for the work piece, means having openings therethrough arranged in the pattern of the openings in the work piece, said openings in said means being adapted to support a plurality of wire work pieces to be inserted in the openings in the work piece, said means, when said apparatus is in use, being positioned adjacent to the support for the work piece with the openings in said means and in said work piece extending in the same direction, and means adjacent to said support for rotating the work piece to a position such that the openings therein are congruently arranged with respect to those of said means, whereby said wire work pieces are adapted to drop from the openings in said means and into the openings in said work piece when said same direction includes a vertical component.

2. A loading device comprising support means adapted to support a work piece in horizontal position, loading means snugly engaging said support means and extending thereabove during use of said device, said loading means having vertically extending passageways disposed in a pattern similar to the pattern of openings extending through said work piece, said passageways being adapted to support a plurality of wire work pieces to be inserted in said openings and means connected to said support means and adapted to bounce said work piece in successive angular movements in one direction about its axis for disposing said openings in register with said passageways, said openings and passageways extending in the same direction, whereby said wire work pieces in said passageways are adapted to drop simultaneously into said openings.

3. A loading device comprising means adapted to support a wafer work piece in a horizontal position having openings extending therethrough and, means having openings arranged in the pattern of the openings in said apertured work piece, said openings being adapted to support a plurality of parallel wire work pieces above said wafer and in a transverse pattern similar to the transverse pattern of openings in said wafer said openings in said support means and in said wafer work piece, extending in the same direction, means for vibrating said support means to cause said wafer to bounce on said support means, and means extending into said wire support means for rotating said wafer on its axis while bouncing, to a position wherein said openings in said work piece are in longitudinal register with said openings in said support means whereby said wires drop into said openings in said work piece.

4. A loading device comprising a support adapted to support a work piece having openings extending therethrough, a loading fixture disposed above said support and having passageways disposed in a pattern congruent with the pattern of said openings, said openings and passageways extending in the same direction during use of said device, said passageways being adapted to receive wire work pieces in positions initially resting on said work piece, and means for rotating said work piece on an axis parallel to said openings while said wires are in said position, whereby said openings are brought into longitudinal register with said passageways and said wires in said passageways drop into said openings when the said same direction includes a vertical component.

5. A loading device comprising a work holder having a horizontal surface adapted to hold in a horizontal position, a wafer work piece having openings extending normally therethrough, a loading fixture snugly engaging said holder and positioned thereabove, said fixture having passageways extending therethrough and adapted to be disposed in longitudinal register with said openings when said wafer is rotated axially to a predetermined position wherein said register occurs, and vibratory means for transmitting torque pulses to said holder in an angular direction with respect to the axis of said wafer to dispose said wafer in said predetermined position, whereby said wafer is rotated about its axis and wire work pieces fed into said passageways are delivered into said openings.

6. A loading device comprising an assembling fixture adapted to support a wafer work piece loosely in a horizontal plane and wherein said wafer has axially parallel openings extending therethrough, a loading fixture positioned above said assembling fixture and having vertically extending passageways therethrough mutually spaced to assume simultaneous register with said wafer openings when said wafer is axially rotated, said loading fixture defining a free space between the wafer and itself, whereby said wafer is free from contact with said loading apparatus, means for vibrating said wafer to reduce the friction between said wafer and said assembling fixture, said loading fixture having a side recess exposing a side of said wafer, means extending into said recess and adapted to rotate said wafer on its axis to cause said passageways to assume longitudinal register with said openings, whereby wire work pieces loaded into said loading fixture are delivered into said openings, and means within said assembling fixture for limiting the magnitude of extension of said wires through said wafer.

References Cited in the file of this patent

UNITED STATES PATENTS

| | | |
|---|---|---|
| 2,334,004 | Herzog | Nov. 9, 1943 |
| 2,349,956 | Gliss | May 30, 1944 |
| 2,400,122 | Kew | May 14, 1946 |
| 2,740,189 | Moore | Apr. 3, 1956 |
| 2,768,431 | Hughes | Oct. 30, 1956 |
| 2,870,728 | GoodyKoontz | Jan. 27, 1959 |